Sept. 22, 1964

H. M. MILLER 3,150,080

DUSTING APPARATUS

Filed June 14, 1961

INVENTOR.
Hilliard M. Miller,
BY

Sept. 22, 1964          H. M. MILLER          3,150,080
                        DUSTING APPARATUS
Filed June 14, 1961                          3 Sheets-Sheet 2
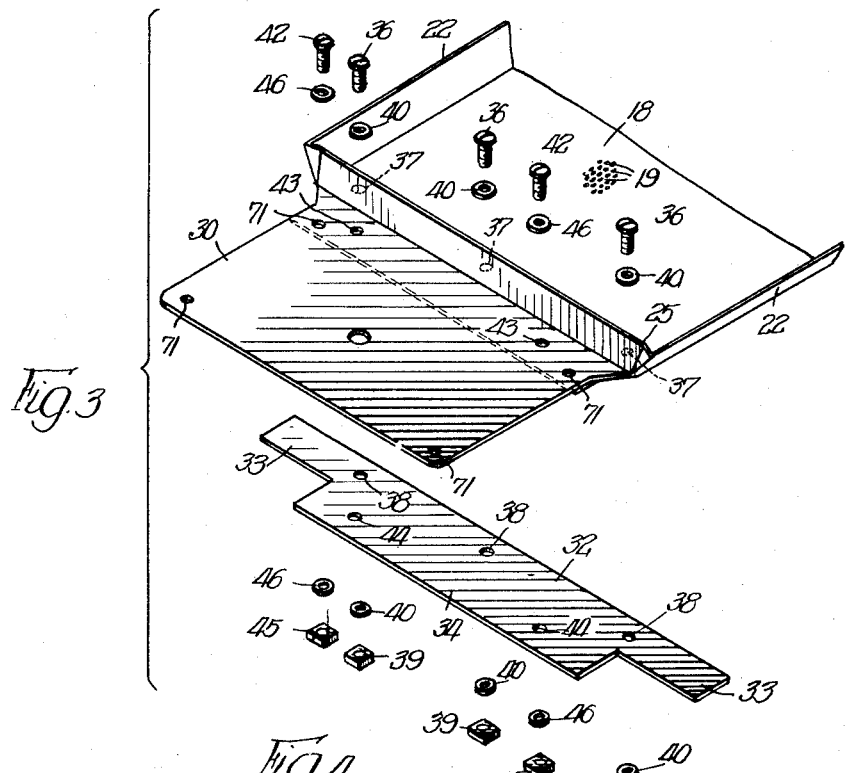
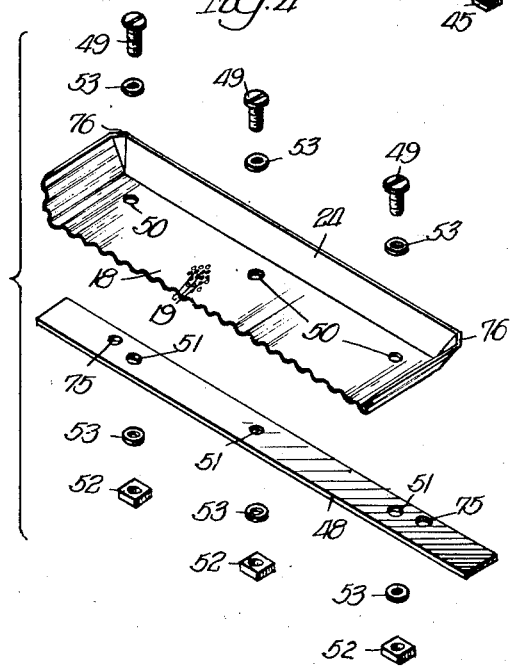
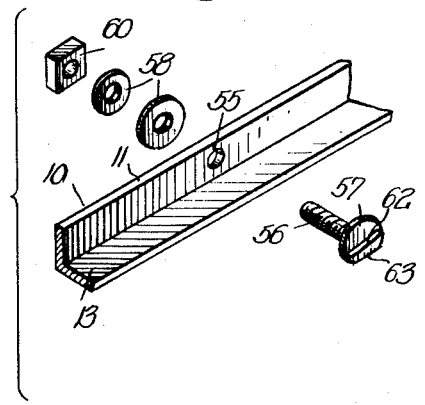
INVENTOR.
Hilliard M. Miller, Sept. 22, 1964　　　　　H. M. MILLER　　　　　3,150,080
DUSTING APPARATUS
Filed June 14, 1961　　　　　　　　　　　　　　3 Sheets-Sheet 3
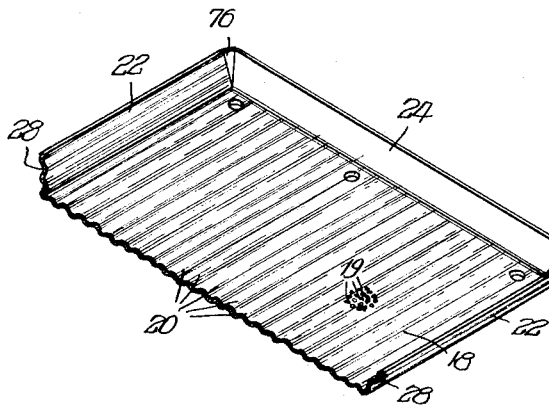
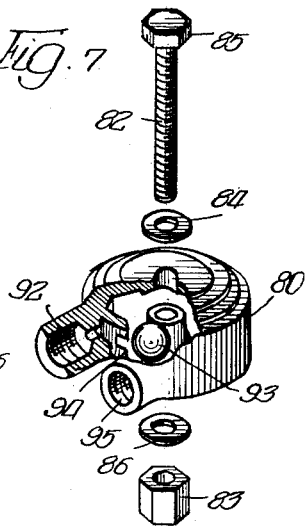
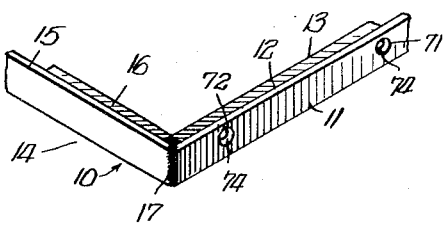
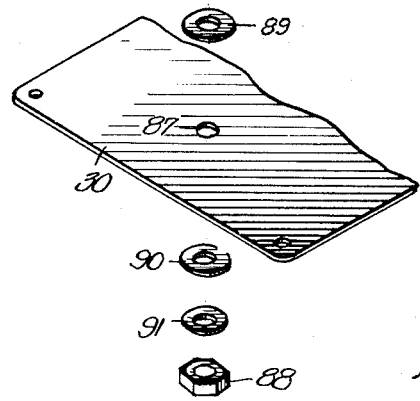
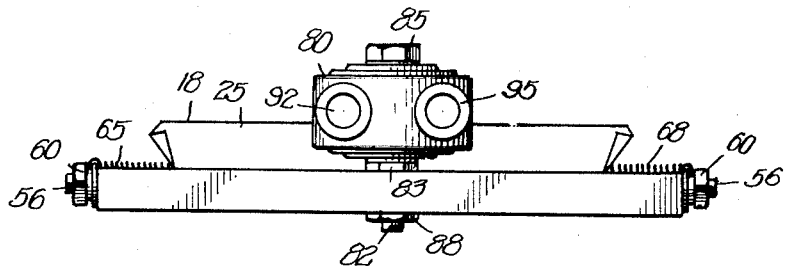
INVENTOR.
Hilliard M. Miller,
BY

3,150,080
DUSTING APPARATUS
Hilliard M. Miller, Prairie Village, Kans., assignor to Corn Products Company, New York, N.Y., a corporation of Delaware
Filed June 14, 1961, Ser. No. 117,185
9 Claims. (Cl. 209—332)

This invention relates, in general to dusting apparatus, and has particular relation to an improved dusting apparatus for dusting powdered edible starch on bread dough, or the dough for other bakery products, or the trays or other apparatus therefor, or both, prior to baking.

It is to be understood, however, that the dusting apparatus according to the present invention is not limited in its broader aspects to the use mentioned above and hereinafter in the present application, but may be employed for all similar work.

In dusting equipment originally installed for the use of wheat flour, an excessive amount of starch will be deposited on the dough, loaf, trays or the like if some provisions are not made to compensate for this. The common practice is to blind off part of the screen, or to provide a finer screen. As the agitation provided in these flour dusters is not well suited for handling starch, the above modifications will result in the lumping, "bridging," or massing together of the starch particles.

One of the main concepts of the present invention resides in the provision of an improved starch dusting apparatus which provides a relatively simple, inexpensive and improved distribution of starch resulting from the use of conventional flour dusting facilities.

It is common practice to meter out a predetermined amount of dusting material, such as starch, for dusting a definite batch of bakery products. Where, as is frequently the case, the starch contains lumps, the distribution of dusting material tends to be uneven, since the breaking up of such lumps tends to be delayed.

Another concept of the present invention resides in the provision of an improved starch dusting apparatus which will break up or reduce clumps of starch into minute dust-like particles and which is not wasteful and will provide even distribution of the starch on the dough, trays, or other objects.

Another concept resides in the provision of dusting apparatus having a fine mesh screen in which a high frequency vibrating action is obtained which is effective in disbursing or dissolving starch lumps, or causing such starch lumps or clumps to be broken up instantly into dust, for complete dispersion of the starch particles and uniform fall onto the dough pieces or trays, or other apparatus to be dusted.

More particularly, according to the present invention, the perforated screen has hole sizes of 0.02 of an inch in diameter or less and about 650 such holes per square inch of perforated screen, and the sheet of which the perforated screen is made is very thin, for example, about 0.02 of an inch thick.

Another feature of the invention resides in the provision of a spring suspension for the perforated screens which permits yield and movement of the screen in any horizontal direction.

Another feature resides in the provision of vibrator means mounted with and onto or attached to the perforated screen and operable to produce a rotating type of vibration of the perforated screen in a horizontal plane.

Another feature resides in the provision of a perforated screen having shallow corrugations which stiffen the screen and help maintain a level position with no buckling of the surface and which also prevents "wandering" of the starch before it is shaken through the screen. These corrugations extend the flow linearly of the corrugations so that there are a number of parallel lines of distribution. As a result, even distribution of the starch on the dough pieces or apparatus is provided and a wide distribution in the direction of the corrugations is obtained.

Another feature resides in the provision of a starch dusting apparatus adapted for use beneath existing flour dusting boxes as will hereinafter appear.

The suspension of the screen upon a series of oppositely acting coil springs under tension combined with vibration imparting means which does not limit the freedom of motion of the screen, permits of a novel operation of great advantage. The screen partakes of a vibratory motion which is not a mere reciprocation or reciprocation with rocking in a single plane or direction. The screen in the present device is suspended between opposed tension springs in what may be termed a catenary suspension. This catenary suspension, by means of a series of radially acting coiled tension springs, permits the screen to have universal movement.

Movement of the screen in any substantially horizontal direction from a balanced or rest position, will cause one spring or several springs to be stretched and thereby to exert greater supporting or lifting effect upon the attached part of the screen. The other opposed spring or plurality of springs is simultaneously caused to contract and reduce the supporting effect and thereby allow the adjacent attached end of the sieve to move forward and downward.

Since in the present device the vibration producing means consists of an eccentrically rotatable mass and a casing or frame attached to and movable with the screen in any direction, the motion resultant from rotation of the eccentric mass and the spring suspension is a gyratory motion of the screen combining horizontal components, vertical components and rotary components of motion of the spring supported screen. This gyratory motion of the screen is surprisingly effective in breaking up lumps and in spreading the major charge of starch over the active surface of the screen and delivering the starch through the fine openings of the screen.

Numerous advantages and adaptations of the invention will be apparent from the following detailed description taken in connection with the accompanying drawings, it being understood that the invention is limited only within the scope of the appended claims and not to the particular embodiment selected for illustration.

In the drawings:

FIGURE 3 is a fragmentary exploded view showing the manner in which the transverse strap and vibrator mount are attached to one end of the perforated screen;

FIGURE 4 is a fragmentary exploded view showing the manner in which the other transverse strap is attached to the bottom of the opposite end of the perforated screen;

FIGURE 5 is a fragmentary exploded perspective view showing the manner in which stove bolts are attached to the upright flanges of the side bars of the frame;

FIGURE 6 is a fragmentary perspective view at one end of the perforated screen;

FIGURE 7 is a fragmentary exploded view showing the manner in which the vibrator is mounted on and attached to the vibrator mount;

FIGURE 8 is a fragmentary perspective view of one of the corners of the frame; and FIGURE 9 is an end view of the apparatus looking toward the vibrator end thereof.

Figure 1:
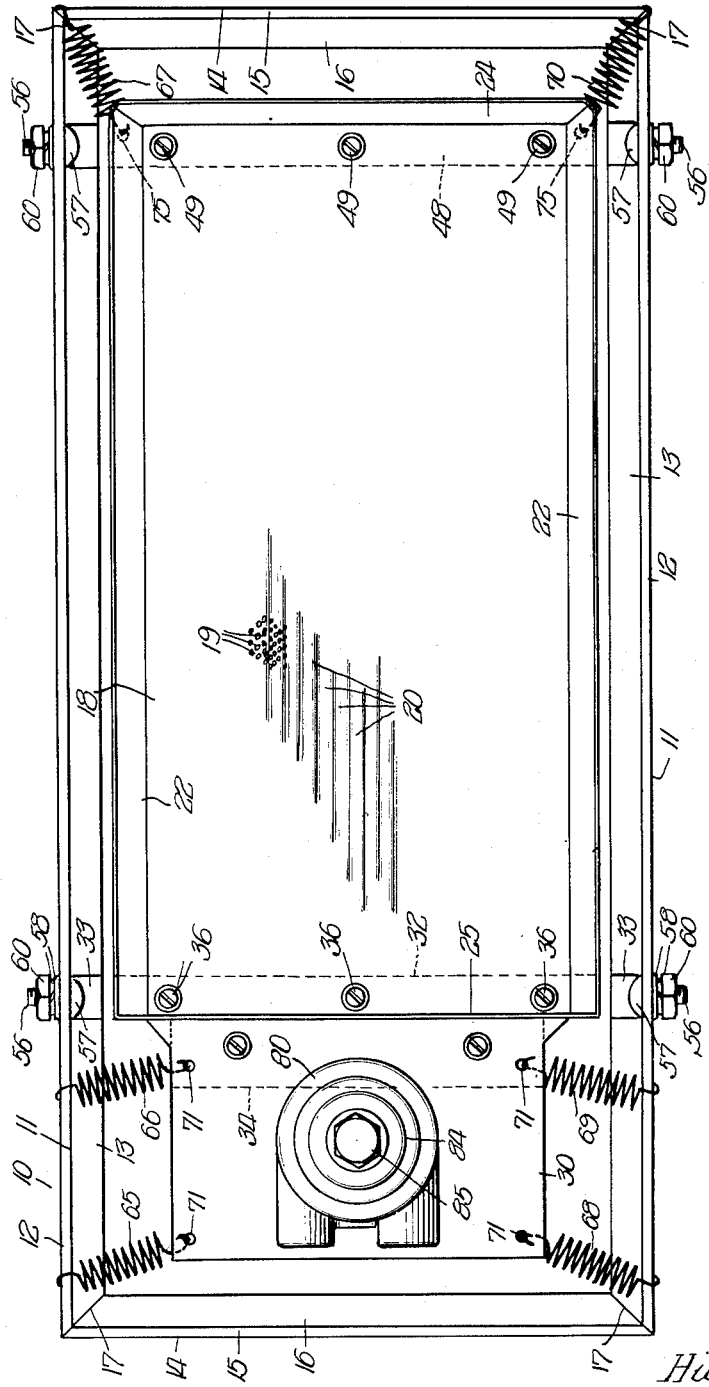
FIGURE 1 is a top plan view of dusting apparatus according to the present invention.

Referring to the drawings, the dusting apparatus, according to the present invention, comprises a generally rectangular frame 10 made of aluminum angle bar stock. The bar stock may be 1/8 inch thick with the upright flanges and the horizontal flanges each 1 inch wide.

The angle bars forming the long sides of the frame are designated 11 and have upright flanges 12 and horizontal flanges 13. The bars forming the shorter cross members or ends of the frame are designated 14 and have upright flanges 15 and horizontal flanges 16. The ends of the bars 11 are brazed, for example, to the adjacent ends of the bars 14 as indicated more or less diagrammatically at 17 in FIGURES 1 and 8.

The shaker or dusting screen 18 is made from perforated bronze or brass sheet material having, for example, a thickness of about 0.02 of an inch. The perforated screen 18 has holes 19 which are preferably of 0.02 of an inch in diameter or less, with about 650 of such holes or perforations per square inch of screen.

The perforated screen 18 has shallow corrugations 20 shown extending lengthwise of the screen, although the screen may be corrugated in either direction. About 1/64 of an inch is a satisfactory depth of corrugation. The corrugations 20 stiffen the screen and help maintain a level position with no buckling of the surface of the screen. The corrugations 20 also aid in distribution of the starch. They prevent "wandering" of the starch before it is shaken through the screen. The flow is extended linearly of the corrugations 20 so that there are a number of parallel lines of distribution of the starch. As a result, even distribution of the starch on the dough pieces or apparatus is provided and a wide range of distribution in the directions of the corrugations is obtained.

The two long sides 22 of the screen 18 are turned up 7/8 of an inch at a 45° angle and one end 24 is also turned up at the same angle or at a greater angle as illustrated in the drawings. The other end 25 is turned up 7/8 of an inch at a 90° angle. The turned up sides 22 and turned up end 24, and, if desired, the turned up end 25 are covered with masking tape or other means, indicated at 28 in FIGURE 6, for closing the holes 19 along such turned up sides and/or ends to preclude passage of starch therethrough. Such tape, or other sealing means, may, of course, be omitted by perforating only the flat horizontal portion of the screen between the sides 22 and the ends 24 and 25.

The 90° angle end 25 of the screen 18 is attached to a vibrator mount 30 of proper size, which is made of 1/16 inch thick stainless steel sheet. This attachment is accomplished by a strap 32 illustrated in FIGURES 1 and 3 of 1/16 of an inch stainless steel having projecting ends 33 about 1/2 of an inch wide and a wider intermediate portion 34. The strap 32 is secured to the bottom of the screen 18 by screws 36 which pass through openings 37 in the screen 18 and openings 38 in the strap 32 and engage in nuts 39 with washers 40 interposed between the nuts 39 and the bottom of the strap 32 and between the heads of screws 36 and the top of the screen, as illustrated in exploded relation in FIGURE 3.

The adjacent end of the vibrator mount 30 overlies the wider intermediate portion 34 of the strap 32 and is secured to the top thereof by screws 42 which pass through openings 43 in the mount 30 and openings 44 in the strap 32 and engage in nuts 45 with washers 46 interposed between the nuts 45 and the bottom of the strap 32 and between the heads of screws 42 and the top of the mount 30.

Across the bottom of the screen 18 at or near the turned up end 24 is secured a strap 48 of 1/16 of an inch thick stainless steel 1/2 of an inch wide. The strap 48 is secured to the bottom of the screen 18 by screws 49 which pass through openings 50 in the screen 18 and openings 51 in the strap 48 and engage in nuts 52 with washers 53 interposed between the nuts 52 and the bottom of the strap 48 and between the heads of screws 49 and the top of the screen 18 as illustrated in exploded relation in FIGURE 4.

The upright flanges 12 of the side bars 11 of the frame have four openings 55, two in each bar and one of which is shown in FIGURE 5. The shanks of four round headed stove bolts 56 are inserted through the openings 55 with the bolt heads 57 inside the frame and with suitable intervening washers 58. Nuts 60 threaded upon the outwardly projecting shanks of the bolts 56 secure the bolts 56 to the flanges 12 of the side bars 11.

The heads 57 of the bolts 56 are slotted at 62 and are flattened at 63 as illustrated in FIGURE 5 for clearance parallel with the drive slots 62. The opposite ends of projecting ends 33 of the strap 32 and the opposite ends of the strap 48 project from the longitudinal sides of the screen 18 and fit loosely in the slotted heads 57 of the bolts 56 for stabilization purposes. The use of "Nylon" or "Teflon" or other slots in place of the bolt heads is contemplated within the scope of the present invention.

The suspension of the screen 18 with the vibrator attached for yield and movement in any horizontal direction is achieved by the use of six coiled extension springs 65, 66, 67, 68, 69 and 70 of proper length and tension. Two of the springs, i.e., springs 65 and 66 are attached at their inner ends to the vibrator mount 30 by hooking of their inner ends through openings 71 in the mount 30. The outer ends of the springs 65 and 66 are attached to the adjacent bar 11, for example, by hooking through openings 72 in the flange 12 of the bar 11. The springs 68 and 69 are similarly connected between the opposite side of the vibrator mount 30 and flange 12 of the other bar 11. The openings 72 are preferably drilled and countersunk as shown at 74 in FIGURE 8.

The remaining two springs 67 and 70 are attached at their inner ends to the corners of the opposite end of the screen 18, for example, by hooking through openings 75 in the strap 48. The outer ends of the springs 67 and 70 are attached to the frame 10, for example, by hooking through openings at or near the corners of the frame 10.

The spring attached to the vibrator mount 30 are generally normal to the sides of the frame 10. The springs 67 and 70 at the opposite end of the screen 18 are disposed at approximately 45°, thus pulling forward and sidewise on the screen 18 and thereby causing the springs 65, 66, 68, and 69 to assume a corresponding diagonal position to equalize the pull of the springs 67 and 70, and thereby to suspend the screen 18 and its connected vibrator 80 through the opposed tension of the connected springs. The load of the screen and vibrator, and the charge of dusting powder carried by the screen, tends to pull the inner ends of the suspending springs 65, 66, 67, 68, 69 and 70 downwardly to increase the tension on said springs, and thereby increase their load supporting force.

The spring suspension above referred to is peculiarly advantageous for supporting and cooperating with the sifting screen and its connected rotary vibration producing member 80. The combined effect of the rotating unbalanced mass, namely, the ball 93 in the vibrating device 80, with the spring suspension, is to produce a gyratory motion of the screen of great effectiveness. In conjunction with the corrugations, this motion of the screen is highly effective in breaking up lumps of the dusting material. Under the action of the screen, the lumps appear to melt away.

The opposed coil springs being connected in tension between the relatively stationary frame, are subject to differential displacement by any force tending to move the screen other than straight up and down.

In FIGURE 1, if the screen 18 is at a particular instant moved by the vibrator in a direction, for example towards the right in the plane of the paper of FIGURE 1, that movement will require the springs 65, 66, 68 and 69, at the left end of FIGURE 1 to lengthen, and this displacement creates greater tension in those springs.

Such increase in tension exerted endwise of the springs at the left of FIGURE 1 causes them to pull harder upwardly on the left end of the rigid screen and vibrator member. At the same time, such movement towards the right permits the springs 67, 70 to shorten, and their tension decreases, and they will give less support to the right end of the said rigid screen and vibrator. The result is that the motion of the rigid suspended screen towards the right will be accompanied by a raising of the left hand end and a lowering of the right hand end of the movable screen member.

This same type of action is produced in the screen by any movement of the screen in a horizontal direction produced by the revolving ball 93 of the vibrator 80. Consequently, the movement, which is the result of the horizontal forces produced by the rotating ball and the reaction by the tensioned spring suspension, is a constantly shifting tilting movement in the nature of a circular vibratory motion which is highly effective in breaking up lumps of the dusting material on the screen and of causing the fine powdery dusting material to pass freely through the apertures of the screen.

The placing of the ends of bars 48 and 32 in the slots 62 of the bolt heads provides limitation of the amplitude of displacement of the screen by either the load put on the screen by a charge of dusting powder, or by the shaking effect of the screen produced by the joint action of the vibrator and the spring suspension as aforesaid.

As illustrated at 76 in FIGURES 4 and 6, the corners of the turned up sides and ends of the screen are closed and may be soldered or brazed.

The vibrator 80 is mounted on or attached to the vibrator mount 30 and is thus mounted with or attached to the perforated screen 18. One suitable vibrator is the size 10 Model SAH "Vibrolator" marketed by Martin Engineering Company of Neponset, Illinois, although any similar device may be employed. Examples of vibrators of this character will be found in Edwin F. Peterson Patents 2,480,603; 2,528,319; 2,535,596; 2,778,230; 2,778,612; and 2,793,009.

Figure 2:
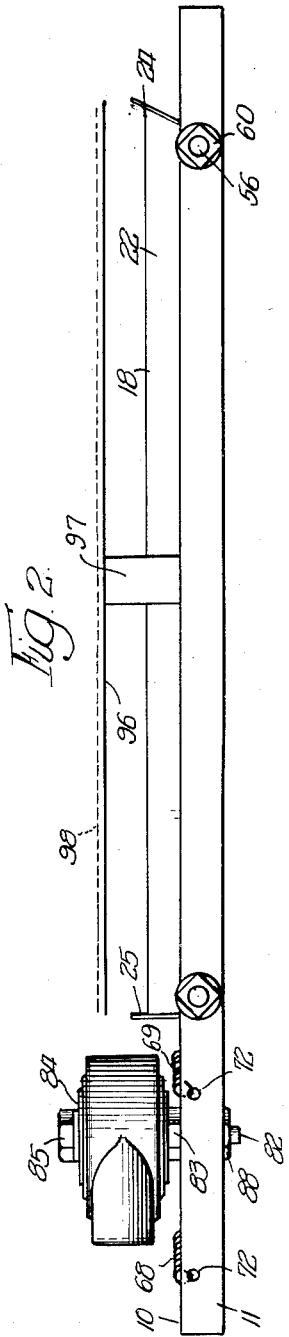
FIGURE 2 is a side view of the dusting apparatus illustrated in FIGURE 1, showing the same positioned beneath an existing flour sifter box.

The aforementioned size 10 Model SAH "Vibrolator" weighs only about 8 ounces. As illustrated in FIGURES 1, 2 and 9 and in exploded relation in FIGURE 7, the vibrator 80 is attached to the mount 30 by a bolt 82 which passes through the body of the vibrator and engages in a nut 83 with a washer 84 interposed between the head 85 of the bolt and the top of the vibrator and another washer 86 interposed between the nut 83 and the bottom of the vibrator.

The shank of the bolt 83 extends down through an opening 87 in the mount 30 and engages in a nut 88 with a washer 89 interposed between the nut 83 and the upper surface of the mount 30 and washers 90 and 91 interposed between the undersurface of the mount 30 and the nut 88.

Suffice it for purposes of the present application to state that air at a pressure of about 20 pounds per square inch enters the inlet 92 of the vibrator 80 and spins a steel ball 93 around a race 94 at high speed to produce an enormous powerful, all-directional vibration. The spent air passes out through an outlet or exhaust port 95. The vibrator 80 is a fluid pressure motor. It consists of a frame or body which forms a stator, and a steel ball 93 which forms a rotor. The ball or rotor 93 runs in a circular path as it travels in the race 94. It acts as an inertia member and being dynamically unbalanced by reason of the fact that the center of mass of the ball or rotor is eccentric with respect to the axis of rotation in the circular race, it produces a force acting radially outwardly from the axis of the circular path 94 changing in direction as the ball 93 moves around in the race 94. Thereby, the interaction between the stator and rotor produces a gyratory movement of the vibrator frame or body and the attached screen.

It will be apparent from the foregoing description and the drawings that the perforated screen 18 of the present application has no frame attached thereto for movement therewith. Such an attached frame would subdue or minimize independent vibration of the screen. Instead, the screen of the present application has no such frame and as a result the apparatus of the present application is able to produce an independent ultra-high frequency vibration in the screening section similar to the action of a reed in a wind musical instrument. One suitable form of vibrator 80 for purposes of the present invention is capable of producing approximately 17,000 vibrations per minute of the perforated screen 18 with air entering the inlet 92 of the vibrator at a pressure of approximately 20 pounds per square inch.

The aforementioned ultra-high frequency vibration is important in causing the starch clumps to be broken up instantly into a dust which is desired for complete dispersion of the starch particles for uniform fall-out onto the dough pieces, trays or other apparatus to be dusted. In addition to this ultra-high frequency vibration, the apparatus of the present invention obtains benefit of the reciprocal, rotary action of the air vibrator due to none of its energy being absorbed by non-essential heavy framework.

In use, the dusting apparatus of the present invention is positioned approximately 1¼ inch beneath the existing flour sifter box indicated diagrammatically at 96 in FIGURE 2. Two straps of bar stock 97 are attached to the bottom of the flour dusting box 96 and the frame of the present dusting apparatus is attached to the straps, for example, with stove bolts to hold the present dusting apparatus beneath the flour box about the amount above indicated.

The existing flour sifter box 96 meters the starch and passes it through a coarse screen illustrated diagrammatically at 98 onto the fine mesh screen 18 with the 0.02 of an inch or less openings 19. Then, as previously indicated, the dusting apparatus of the present invention causes the starch lumps to be broken up or disssolved instantly into dust for complete dispersion of the starch particles and uniform fall-out onto the dough pieces or trays or other apparatus to be dusted.

The present apparatus is adapted particularly for dusting Buffalo powdered starch, but it is to be understood that the apparatus is suitable for dusting any powdered edible starch.

The particle size range of Buffalo Starch No. 3401 is from 4 to 20 microns, the average being 14 microns. Most of the starch (99.9%) will pass a 12xx silk screen which is 125 mesh. The screen size ranges from 0.0037 to 0.0059 of an inch, the average being 0.0042 of an inch. However, this is the usual particle size for powdered starch.

The embodiment of the invention disclosed in the drawings and specification is for illustrative purposes only, and it is to be expressly understood that said drawings and the specification are not to be construed as a definition of the limits or scope of the invention, reference being had to the appended claims for that purpose.

I claim:

1. In dusting apparatus of the character described, a main frame, a relatively light weight fine mesh perforated screen, a vibrator mounted upon and attached to said screen and operable to impart high frequency rotating vibration to said screen in a horizontal plane, a spring suspension for said screen consisting of substantially horizontally disposed coil springs connected in tension between said main frame and said screen, which suspension permits yield and movement of said screen in any horizontal direction, and straps secured across the bottom of said screen, said straps having flat ends projecting from opposite margins of said screen and fitting loosely in horizontal slots in slotted parts of said main frame for stabilization purposes.

2. In a device of the class described, a moveable shallow panlike screen member disposed normally is substantially a horizontal plane, a stationary frame member normally disposed in substantially horizontal position and encircling said screen member, a series of coil tension springs attached to and stretched between the screen member and the frame member and pulling against each other through the screen member to suspend the screen member from the stationary frame member in a free catenary suspension, and a high frequency vibrator having a frame and a vibratory mass movable relative to the vibrator frame and being mounted for rotary motion about a substantially vertical axis eccentric to its own center of mass, said vibrator frame being mounted on the screen member, said vibrator being operable to impart high frequency rotary vibrational forces to said spring suspended screen member in substantially the plane of said latter member.

3. The device of claim 2 wherein the screen member is a shallow pan of thin sheet metal having its bottom perforated with numerous fine holes and containing shallow longitudinal corrugations, and the vibrator moving the screen with a horizontal component of motion transverse to said corrugations.

4. The device of claim 2 wherein the vibrator has a metal ball driven by a current of gas and a casing having a substantially horizontal circular race for guiding said ball, said vibrator being mounted upon said screen and transmitting components of its rotary motion to said screen to produce substantially horizontal gyratory vibrational movement of the screen member.

5. The device of claim 2 wherein the vibrator comprises a vibrator body member comprising a mass mounted rigidly upon the spring suspended screen member and an eccentric mass rotatable relative to and interacting at high speed with said stationary vibrator body member, the interaction between said masses producing rotary vibratory motion of the screen member in a horizontal circular path.

6. In a device of the class described, a relatively movable screen disposed substantially horizontally, a vibrator mounted rigidly on said screen, said vibrator comprising a casing within which is a substantially horizontal circular race and a ball freely movable in said race by a current of air admitted to the casing, a substantially horizontal stationary frame embracing said screen, and a series of substantially horizontal disposed oppositely acting coil springs stretched in tension and attached at their opposite ends to the frame and to the screen respeticvely to provide the entire support of said screen and vibrator whereby the screen is subjected to the substantially horizontal vibratory forces produced by the reaction between the ball and the connected screen and vibrator casing.

7. In a device of the class described, a substantially rigid pan shaped perforated sheet metal screen, a vibrator comprising a body portion rigidly mounted on said screen and an inertia member movable in a definite closed path relative to the body portion and in a substantially horizontal plane, said vibrator being adapted to produce high frequency vibratory motion of said inertia member, the reaction of said high frequency motion of the inertia member acting upon the frame member and the connected screen, a stationary frame embracing said screen and vibrator and a series of oppositely acting coil springs stretched in tension and attached at their opposite ends to the frame and to the screen respectively whereby the screen and vibrator are suspended solely by said springs, and the screen and frame portion of the vibrator are subjected to the vibratory forces produced by the reaction between the inertia member and the rigidly connected screen and frame member.

8. In a dusting device the combination of a substantially horizontally disposed supporting frame, a fine mesh screen disposed in said frame, a series of substantially horizontally disposed coil springs connected in tension between the screen and the supporting frame, said springs suspending the screen substantially horizontally in approximately the plane of the supporting frame, said screen being movable substantially horizontally under the resilient restraint of said suspending springs, a power driven vibrator mounted on and carried by the horizontal screen, said vibrator being a motor comprising a stator and a dynamically unbalanced rotor, sadi rotor being constrained to rotate in a plane substantially parallel to the plane of the screen frame and being driven at high rotational speed whereby it imparts a circularly moving radially unbalanced force upon the screen frame, the combined restraint of the spring mounting and the circularly moving unbalanced force producing a rapid disintegration of lumps of powdered material deposited on the screen.

9. In a flour sifter for dusting powdered starch upon goods to be baked, a dusting screen of corrugating sheet material of approximately 0.02 inch in thickness having openings of not to exceed approximately 0.02 inch in diameter and having approximately 650 holes per square inch, substantially horizontally extending tension spring supporting said screen in substantially horizontal position, and a vibrator mounted on the screen for vibrating said screen in substantially a horizontal plane, said vibrator comprising a body attached to the screen and a dynamically unbalanced mass carried by the body and being movable relative to the body in a horizontal plane, whereby the inertia forces created by movement of the mass vibrate the screen in substantially a horizontal plane to cause the starch to move lengthwise of said corrugations and down through said openings, said vibrator having means for producing high speed vibratory movement of said mass.

References Cited in the file of this patent

UNITED STATES PATENTS

| 268,491 | Hubbell | Dec. 5, 1882 |
| 948,222 | Honabach | Feb. 1, 1910 |
| 1,152,650 | Luxmore | Sept. 7, 1915 |
| 1,611,254 | Sturtevant | Dec. 21, 1926 |
| 2,143,610 | Muller et al. | Jan. 10, 1939 |
| 2,267,752 | Ruska | Dec. 30, 1941 |
| 2,355,131 | Kolleda | Aug. 8, 1944 |
| 2,402,340 | Parmenter | Jan. 18, 1946 |
| 2,633,242 | Rhodes | Mar. 31, 1953 |
| 2,645,189 | Hansalik | July 14, 1953 |
| 2,793,009 | Peterson | May 21, 1957 |
| 2,982,410 | Barr | May 2, 1961 |

FOREIGN PATENTS

| 840,450 | France | Jan. 16, 1939 |
| 250,887 | Switzerland | July 1, 1948 |
| 839,441 | Germany | Sept. 13, 1951 |

UNITED STATES PATENT OFFICE
CERTIFICATE OF CORRECTION

Patent No. 3,150,080 September 22, 1964

Hilliard M. Miller

It is hereby certified that error appears in the above numbered patent requiring correction and that the said Letters Patent should read as corrected below.

Column 1, line 60, for "screens" read -- screen --; column 4, line 37, for "spring" read -- springs --; column 6, line 73, for "is" read -- in --; column 7, line 43, for "horizontal" read -- horizontally --; column 7, line 45, for "respeticvely" read -- respectively --; column 8, line 16, for "sadi" read -- said --.

Signed and sealed this 9th day of February 1965.

(SEAL)
Attest:

ERNEST W. SWIDER
Attesting Officer

EDWARD J. BRENNER
Commissioner of Patents